Figure 1:
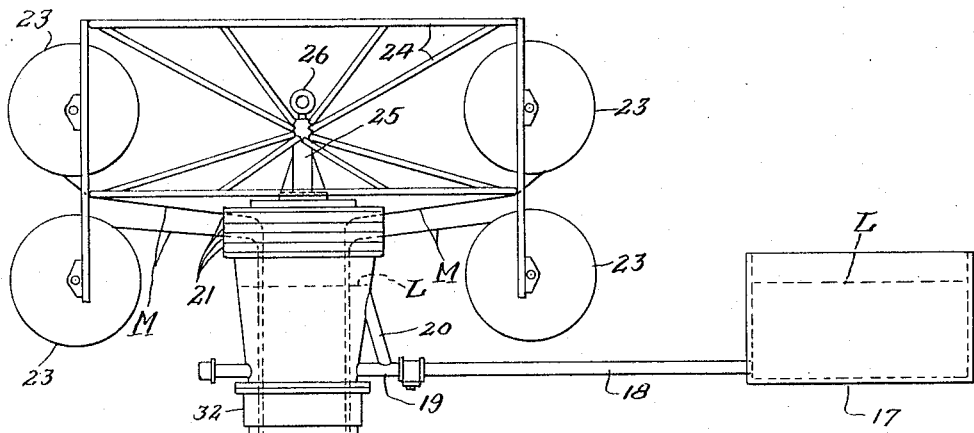

Feb. 14, 1967  LE ROY R. BOGGS  3,303,529
PRODUCTION OF HOLLOW ARTICLES
Filed June 17, 1963  2 Sheets-Sheet 1

INVENTOR.
Le Roy R. Boggs
BY
ATTORNEYS

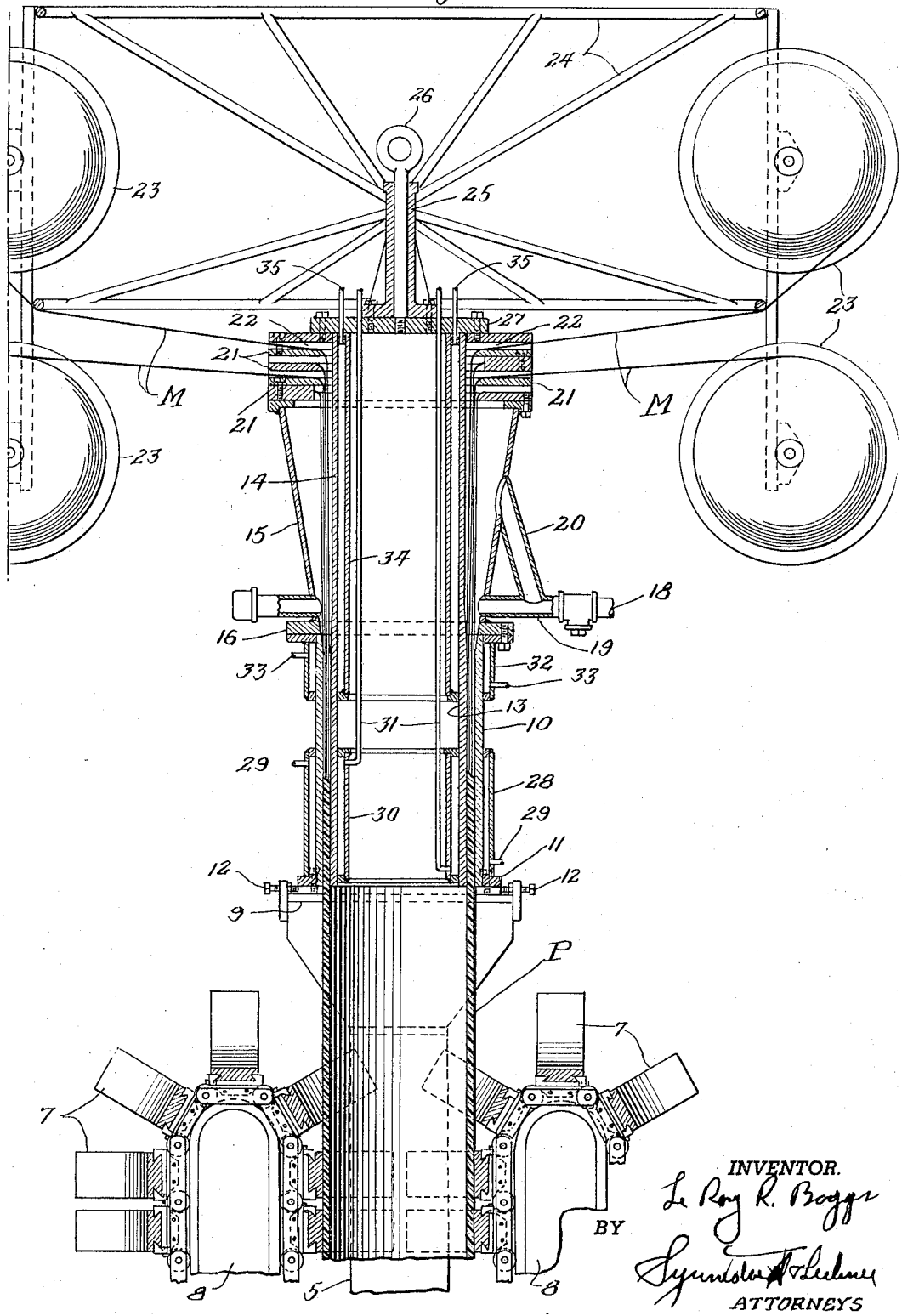

United States Patent Office 3,303,529
Patented Feb. 14, 1967

3,303,529
PRODUCTION OF HOLLOW ARTICLES
Le Roy R. Boggs, Bristol, Tenn., assignor to Universal Moulded Fiber Glass Corporation, Bristol, Va., a corporation of Delaware
Filed June 17, 1963, Ser. No. 288,422
5 Claims. (Cl. 18—4)

This invention relates to the production of hollow articles or shapes formed of fiber reinforced plastic or resin materials, for instance, polyester type resin reinforced with glass fibers.

The invention is especially concerned with the production of such hollow articles in a continuous manner by means of cooperating die and core parts providing a forming passage the cross section of which conforms with that of the hollow article to be made. In such a system, for instance as disclosed in my copending application, Serial No. 115,633, filed June 8, 1961, fiber reinforcement, for instance glass fiber mats, fabric or rovings are impregnated with a heat hardenable liquid resin material, and the impregnated reinforcements are delivered into the entrance end of the forming passage, in which heat is applied in order to set or cure the resin material, and the hardened or solidified article is drawn from the discharge end of the forming passage by means of a puller mechanism which engages the solidified article beyond the discharge end of the forming passage.

The present invention is concerned with improved equipment for producing tubular or hollow articles in accordance with the foregoing general type of operation.

One of the objects of the present invention is the provision of an improved arrangement for supporting or mounting the core within the die, the improved arrangement providing for accuracy and rigidity of core support, which has been difficult to obtain heretofore, because the support for the core can only be located upstream of the point where the fibrous reinforcements are fed into the entrance end of the forming passage surrounding the core.

In accordance with this important aspect of the present invention, the core is provided with an extension projecting upstream from the core proper, and the die is provided with a tubular extension also projecting upstream from the die itself, the core extension being mounted on the upstream end of the die extension for purposes of support. In this arrangement, as contemplated by the present invention, the tubular die extension has an inside diameter greater than that of the die itself and provision is made for introducing liquid resin material and also fiber reinforcement into the interior of the die extension, so as to provide for impregnation of the fiber reinforcement therein and for feed of the impregnated reinforcement into the forming passage provided by the core and die.

In accordance with another aspect of the invention, provision is made, in an arrangement of the kind referred to above, for the mounting of reinforcement supply means on the upstream end of the core extension, and in addition means are provided on the core extension for lifting not only the extension but also the entire core, together with the reinforcement supply means. Indeed, in this arrangement, with the upstream ends of the core and die extensions interconnected, the die and its extension may also be handled as a unit with the core and its extension.

Figure 2:
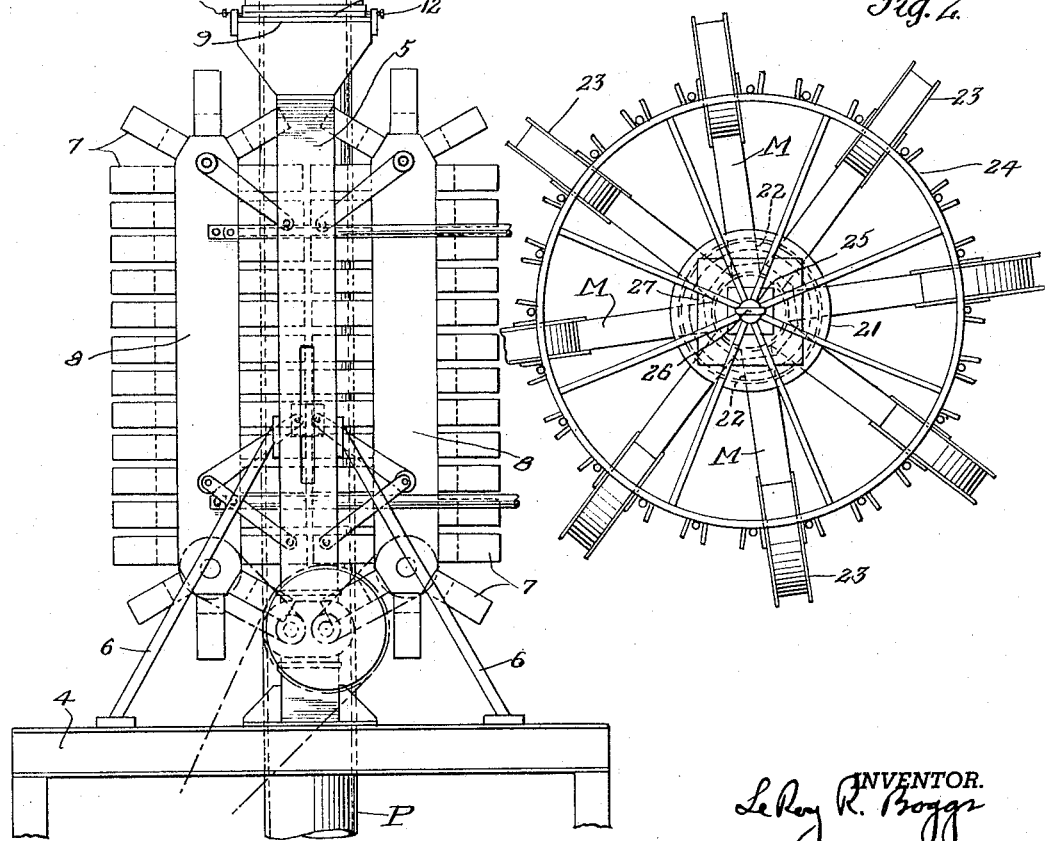

How the foregoing objects and advantages are obtained together with others which will occur to those skilled in the art, will be clear from inspection of the following description referring to the accompanying drawings, in which FIGURE 1 is a side elevational outline view of an apparatus constructed according to the present invention, including not only the core and die parts, but also the fiber reinforcement and resin supply systems, and still further the puller mechanism with which the core and die are associated;

FIGURE 2 is a plan view of the fiber reinforcement supply arrangement illustrated in FIGURE 1; and FIGURE 3 is an enlarged vertical sectional view through portions of the core and die parts shown in FIGURE 1.

Although the arrangement of the invention may be employed in producing tubular or hollow parts of a wide variety of sizes and shapes, in the particular embodiment illustrated in the drawings, the equipment is arranged to produce a pipe indicated by the letter P, the pipe being of substantial diameter, for instance about 17″ in diameter and the wall thickness of the pipe being of the order of ½″.

The apparatus may conveniently be mounted on a supporting structure such as the beams indicated at 4. The puller mechanism comprises a main frame structure 5 the lower end of which is carried on the beams 4, angled braces 6—6 also being provided. The puller mechanism includes a pair of crawler tread devices each incorporating a plurality of puller blocks 7 mounted by means of tread frames 8—8. The general arrangement of such a puller mechanism is disclosed in my copending application, Serial No. 142,749 filed September 18, 1961, now Patent 3,151,354, and certain details of the particular embodiment of the puller mechanism here shown, are also shown in my copending application, Serial No. 288,265, now Patent No. 3,256,559, filed concurrently herewith.

The two crawler tread frames are mounted for yielding movement toward and away from each other so as to grip the pipe P therebetween, the treads also being driven so as to pull the pipe from the forming device which is described herebelow.

At its upper end the main frame structure 5 of the puller mechanism is provided with an abutment plate 9 on which is mounted the hollow die part 10. Fastened to the lower end of the die part 10 is a plate 11 (see FIGURE 3) which rests upon the plate 9 and which is laterally shiftable with respect to the plate 9, adjusting bolts 12 being provided for fixing the adjusted position with respect to the thrust plate of the puller frame.

Within the die is a core part 13, the core part having an outside diameter smaller than the inside diameter of the die part in order to define the forming passage for making the pipe. At its upper end the core 13 carries a core extension 14 which may conveniently be formed integrally with the core itself. The die part 10 also is provided with an upward extension, this part being indicated by the numeral 15 and here being shown as comprising a separately formed part which is fastened to the upper end of the die proper by means of a bolting flange 16.

The die extension 15 advantageously comprises a tubular structure which may desirably be tapered to an enlarged upper end in order to provide a cavity or reservoir chamber for receiving liquid resin material to be employed in the impregnation of fibrous reinforcement fed into the system. For the purpose of introducing the liquid resin into the interior of the structure 15, a supply tank 17 is desirably provided toward one side of the structure (see FIGURE 1) and this supply tank is connected by means of a pipe 18 having branches at 19 and 20 for delivery of liquid resin from the tank 17 into the interior of the structure 15. As shown in FIGURE 1 it will be seen that the tank 17 is so located vertically with respect to the structure 15 that the normal level of the liquid resin indicated at L in the tank will also be established as at L within the structure 15. Preferably this level is high enough in the structure 15 to provide a substantial body of resin therein. The tank 17 may conveniently comprise an open top receptacle into which additional liquid resin may be added from time to time.

Surmounting the upper end of the die extension 15 is a stack of flat annular members 21, each of which has several guide passages therethrough such as indicated in FIGURE 3 at 22, these passages being extended radially and providing points of entrance for fiber reinforcement mats such as those indicated diagrammatically at M. These mats are supplied from spools 23 and the mats enter the upper end of the tubular structure 15 and descend through the resin therein and ultimately pass into the entrance end of the forming passage between the die and core, thereby resulting in filling of the forming passage with the impregnated fiber reinforcement. The mats are desirably arranged in several plies or layers in the manner disclosed in my copending application Serial No. 169,908, filed January 30, 1962, now Patent 3,235,429 issued February 15, 1966.

The fiber mat supply spools 23 are carried by means of a frame structure 24 at the upper end of the equipment, this structure 24 being mounted on the post or standard 25 which is also provided with a lifting ring 26. The post 25 is connected with the plate 27 which is fastened in turn to the upper end of the core extension 14. It will thus be seen that the upper or upstream ends of the core and die extensions 14 and 15 are interconnected through the annular members 21 and the plate 27. As a result of this arrangement the upstream end of the core extension and thus of the core itself is rigidly interconnected with the upstream end of the die extension, which latter is rigidy connected with the upstream end of the die proper. The core and die therefore are maintained in accurate and proper positions with respect to each other, thereby increasing the uniformity of wall thickness of the tubular part being made. At the same time the tubular part 15 serves not only as structural support for the core but also as a vessel for a supply of liquid resin with which the fiber reinforcement is to be impregnated. Rigidity and accuracy of core support are thus provided notwithstanding the fact that the core is supported only in the region upstream of the point where the fibrous reinforcements are fed into their positions surrounding the core.

As best seen in FIGURE 3 the die part 10 is provided with an external jacket 28 providing for circulation of steam or some other heat transfer medium supplied through pipe connections 29, thereby providing for heating of the resin as it passes through the forming passage of the lower region of the die. This heating is effected for curing purposes. Similarly, in the same region the core part 13 is provided with an internal jacket 30 adapted to contain a heating medium circulated by means of pipes 31 which extend upwardly and out through the upper end of the core extension 14.

Attention is now called to the fact that in the region of the upper end of the die proper 10, both the die and the core are tapered to a somewhat enlarged opening communicating with the lower end of the body of resin within the die extension 15. This taper is desirable in order to place the materials entering the die passage under some compression and thereby force out gas or air bubbles. However, in that region it is of importance to avoid any appreciable setting or curing of the resin, and for this purpose the die 10 is provided with an external jacket 32 for the circulation of a cooling liquid, as by means of pipes 33. Similarly, the core 13 is provided with a jacket 34 which extends not only inside the core itself but also upwardly therefrom within the core extension 14. This jacket 34 may be supplied with a cooling medium through pipes 35. The extension of the jacket 34 upwardly through the zone where the body of resin is located within the structure 15 is of importance in order to preclude premature setting of the resin not only within the upper end of the forming passage between the die and core proper but also in the reservoir of liquid resin within the structure 15.

I claim:

1. Apparatus for making hollow articles formed of fiber reinforced resin material, comprising means for supplying fiber reinforcement, means for impregnating the reinforcement with heat hardenable liquid resin material, means for forming the article from the impregnated reinforcement and for heating the impregnated reinforcement to harden the resin and solidify the formed article, and means for pulling the solidified article from the forming means and thereby pulling the impregnated reinforcement into the forming means, the forming means including an external die part and an internal core part respectively provided with an opening and an external surface cooperating to define a forming passage between said parts conforming with the cross section of the hollow article being made, the core part having an extension projecting upstream from the entrance end of the die part and providing for mounting of the core part, and a tubular structure having an opening therethrough of larger size than the opening through the die part, the tubular structure being connected with the entrance end of the die part and projecting upstream therefrom said tubular structure having radially inwardly projecting support means positioned upstream from the entrance end of the die part, said core extension being rigidly connected to said support means for structural support, said tubular structure, projecting support means, and core extension together enclosing a reservoir chamber for liquid resin material the fiber impregnating means including means for introducing heat hardenable liquid resin material into said reservoir chamber the reinforcement supply means being located exteriorly of said tubular structure, and said tubular structure being apertured to provide for feed of the reinforcement from the supply means into said reservoir chamber for impregnation with the liquid resin therein and for feed in impregnated condition to the entrance end of the forming passage between the die and core parts.

2. Apparatus according to claim 1 in which the pulling mechanism has a frame structure and in which the discharge end of the die part of the forming means is mounted on the frame structure of the pulling mechanism.

3. Apparatus according to claim 2 and further including means providing for relatively shifting the positions of the external die part and the line of pull of the pulling mechanism.

4. Apparatus according to claim 1 in which the die and core parts are arranged for vertically downward feed of fiber and resin materials therethrough and further including lifting means connected with the core extension to provide for unitary lifting of the interconnected die part, core part and tubular core supporting structure.

5. Apparatus for making hollow articles formed of fiber reinforced resin material comprising a forming device comprising external die and internal core parts defining an annular generally vertically oriented forming passage having an entrance end for receiving resin impregnated fiber reinforced and having a discharge end for delivering the formed article, a puller mechanism for drawing the formed articles downwardly from the discharge end of said forming device, said puller mechanism having a frame structure, said external die part being mounted on and supported by said frame structure of the mechanism, a tubular die extension extending upwardly from the die part and mounted on the die part and carried thereby, an annular support member mounted on the upper end of said tubular die extension at the upper end thereof and carried thereby, a core extension extending upwardly from said internal core part and rigidly connected thereto, said core extension further being rigidly mounted at its upper end on said annular support member and being carried thereon in depending orientation, said die extension, and said core extension, and said annular support member defining an enclosed liquid resin reservoir chamber immediately above said forming device, means for introducing heat hardenable liquid resin into said reservoir chamber, reinforcement support means mounted exteriorly of said reservoir, and reinforcement guide means giving access to said reservoir chamber for introduction of reinforcement thereinto.

References Cited by the Examiner

UNITED STATES PATENTS

| | | | |
|---|---|---|---|
| 2,175,053 | 10/1939 | Ferngren | 18—14 X |
| 2,194,589 | 3/1940 | Kunz | 18—14 |
| 2,730,761 | 1/1956 | Castellan | 18—13 |
| 2,859,476 | 11/1958 | Lainson | 18—14 X |
| 2,887,721 | 5/1959 | Blanchi et al. | 18—1 X |
| 2,957,201 | 10/1960 | Fields et al. | 18—14 |
| 3,134,150 | 5/1964 | Parke et al. | 22—57.2 |
| 3,228,075 | 1/1966 | Lindemann | 18—14 X |

WILLIAM J. STEPHENSON, *Primary Examiner.*